US012705001B2

(12) United States Patent
D'Eliseo et al.

(10) Patent No.: US 12,705,001 B2
(45) **Date of Patent: *Aug. 11, 2026**

(54) INTEGRATED PIVOT TABLE IN A LOGICAL-TO-PHYSICAL MAPPING

(71) Applicant: Lodestar Licensing Group LLC, Evanston, IL (US)

(72) Inventors: Giuseppe D'Eliseo, Caserta (IT); Luca Porzio, Casalnuovo (IT); Stephen Hanna, Fort Collins, CO (US)

( * ) Notice: Subject to any disclaimer, the term of this patent is extended or adjusted under 35 U.S.C. 154(b) by 31 days.

This patent is subject to a terminal disclaimer.

(21) Appl. No.: 19/025,806

(22) Filed: Jan. 16, 2025

(65) Prior Publication Data

US 2025/0156120 A1 May 15, 2025

Related U.S. Application Data

(63) Continuation of application No. 18/603,117, filed on Mar. 12, 2024, now Pat. No. 12,216,943, which is a (Continued)

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0679* (2013.01); *G06F 12/10* (2013.01); *G06F 2212/7201* (2013.01)

(58) Field of Classification Search
None
See application file for complete search history.

(56) References Cited

U.S. PATENT DOCUMENTS 8,370,597 B1 * 2/2013 Chatterjee ............. G06F 3/0685 711/158
11,151,052 B2 10/2021 D'Eliseo et al.
(Continued)

FOREIGN PATENT DOCUMENTS

CN 107066393 A 8/2017
CN 110858129 A 3/2020
CN 111506517 A 8/2020

OTHER PUBLICATIONS

Chinese patent office, "CN Notice of Allowance, including Search Report," issued in connection with China Patent Application No. 202210479878.2 dated Aug. 15, 2025 (10 pages total; 5 pages Original & 5 pages machine translation).
(Continued)

*Primary Examiner* — Baboucarr Faal

(57) ABSTRACT

Methods, systems, and devices for integrating a pivot table in a logical-to-physical mapping of a memory system are described. The memory system may receive a read command and read a first entry of a first subset of mapping and a second entry of a second subset of mapping. The second entry may include at least a portion of a pivot table associated with physical addresses of a non-volatile memory device. The memory system may retrieve data from a physical address identified in the pivot table, rather than access a different portion of the logical-to-physical mapping. The memory system may transmit, to a host system, the data retrieved from the physical address identified in the pivot table.

17 Claims, 9 Drawing Sheets

Related U.S. Application Data continuation of application No. 17/971,414, filed on Oct. 21, 2022, now Pat. No. 11,941,300, which is a continuation of application No. 17/315,015, filed on May 7, 2021, now Pat. No. 11,520,525.

(56) References Cited

U.S. PATENT DOCUMENTS

| | | | | |
|---|---|---|---|---|
| 11,275,695 | B1 | 3/2022 | Lercari et al. | |
| 11,321,229 | B2 | 5/2022 | Pu | |
| 2009/0070545 | A1* | 3/2009 | Stecher | G06F 12/1036 711/205 |
| 2015/0169465 | A1 | 6/2015 | Slepon | |
| 2015/0347026 | A1 | 12/2015 | Thomas | |
| 2018/0067866 | A1 | 3/2018 | Shanbhogue et al. | |
| 2019/0065392 | A1 | 2/2019 | Erez et al. | |
| 2019/0220416 | A1 | 7/2019 | Jung et al. | |
| 2020/0034307 | A1 | 1/2020 | Duzly et al. | |
| 2020/0065241 | A1 | 2/2020 | Cho et al. | |
| 2021/0182207 | A1* | 6/2021 | D'Eliseo | G06F 12/1009 |
| 2021/0334009 | A1 | 10/2021 | Jung | |
| 2021/0349829 | A1 | 11/2021 | Cariello et al. | |
| 2021/0406168 | A1 | 12/2021 | Cariello | |
| 2022/0027284 | A1 | 1/2022 | D'Eliseo et al. | |

OTHER PUBLICATIONS

Mingjiang, L., et al., "Improving Random Read Performance of SSD by Host and Device Collaboration", Computer Applications and Software, vol. 37, No. 10, Oct. 2020, 7 pages.

Zhou, Q., et al., "FTL Address Mapping Method Based on Mapping Entry Inter-Reference Recency.", Journal Comput. Res. Develop., vol. 55, No. 5, 2018, pp. 1065-1077.

* cited by examiner

300

700

INTEGRATED PIVOT TABLE IN A LOGICAL-TO-PHYSICAL MAPPING

CROSS REFERENCE

The present Application for Patent is a continuation of U.S. patent application Ser. No. 18/603,117 by D'Elisco et al., entitled "INTEGRATED PIVOT TABLE IN A LOGICAL-TO-PHYSICAL MAPPING," filed Mar. 12, 2024, which is a continuation of U.S. patent application Ser. No. 17/971,414 by D'Eliseo et al., entitled "INTEGRATED PIVOT TABLE IN A LOGICAL-TO-PHYSICAL MAPPING," filed Oct. 21, 2022, which is a continuation of U.S. patent application Ser. No. 17/315,015 by D'Eliseo et al., entitled "INTEGRATED PIVOT TABLE IN A LOGICAL-TO-PHYSICAL MAPPING," filed May 7, 2021, each of which is assigned to the assignee hereof, and each of which is expressly incorporated by reference in its entirety herein.

FIELD OF TECHNOLOGY

The following relates generally to one or more systems for memory and more specifically to integrated pivot table in a logical-to-physical mapping.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
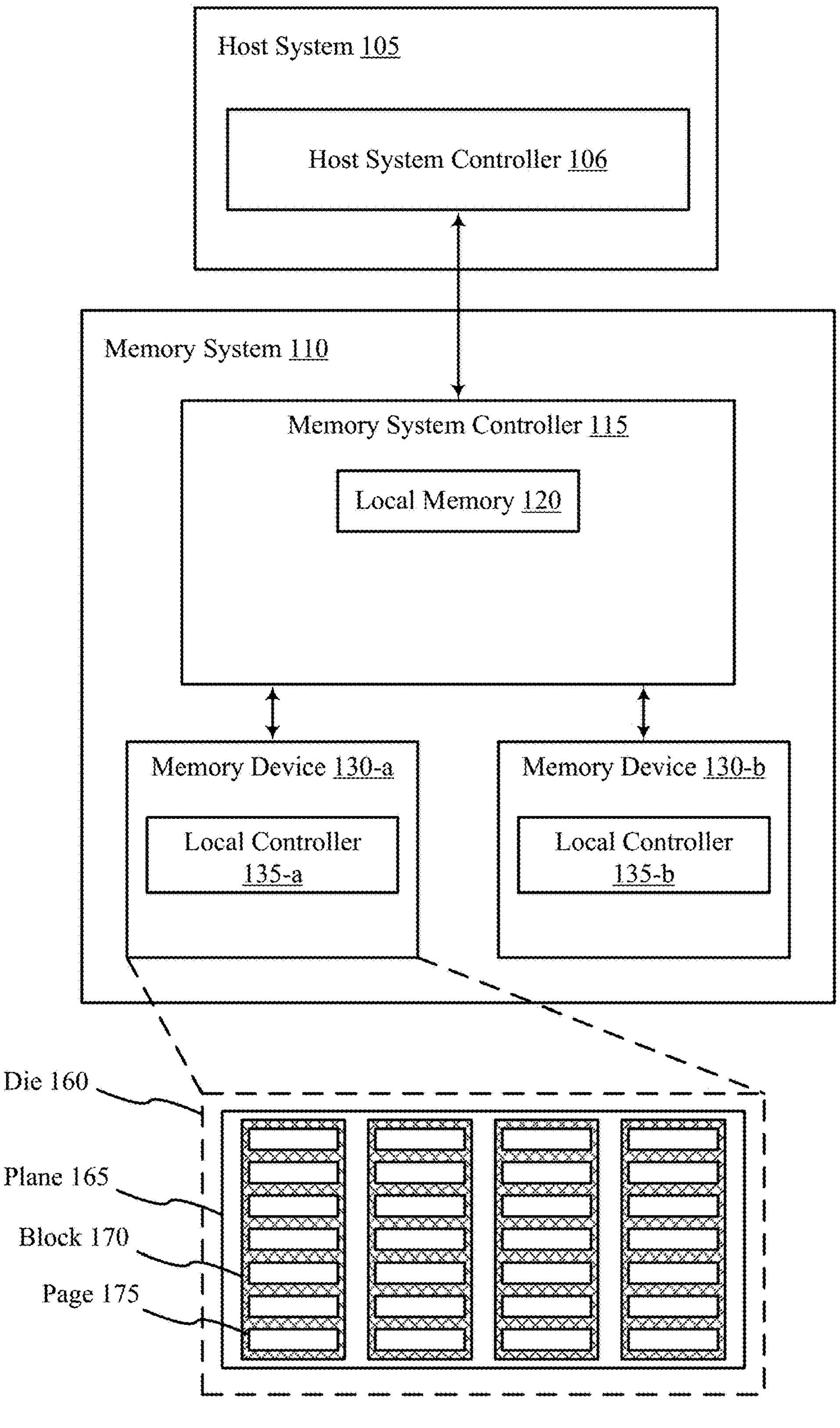
FIG. 1 illustrates an example of a system that supports integrated pivot table in a logical-to-physical mapping in accordance with examples as disclosed herein.

Some memory systems may use a different addressing scheme than an associated host system. For example, a host system may identify data using logical addresses (e.g., logical block addresses (LBAs), virtual addresses, system addresses, or other logical addresses) and the memory system may store the data at physical addresses that are independent of the logical addresses used by the host system. A physical address may identify a physical location of a corresponding memory cell (e.g., or a page of memory cells) within a memory device. The physical location of data within the memory device may change over time due to the memory device accommodating the writing of additional data, maintenance operations performed by the memory device (e.g., garbage collection operations), or for other reasons. A host system coupled with the memory system may reference data (e.g., if issuing read, write, or other commands associated with the data) using the logical addresses, and the memory system may generate and maintain a logical-to-physical (L2P) mapping between the logical addresses used in the communications with the host system and the physical addresses of the memory cells at which the data is stored.

A memory system may use a hierarchical L2P mapping that is divided into multiple subsets (or levels) to map a logical address to a corresponding physical address. The memory system may use the hierarchical L2P mapping to progressively translate a logical block address into the corresponding physical address. For example, a three-level L2P mapping may be divided into a relatively small first subset (e.g., or level) that may include entries that point to different locations of a second subset (e.g., or level). Entries of the second subset may point to different locations of a third subset (e.g., or level), and entries of the third subset may point to physical addresses of pages of data stored in a memory device of the memory system. Thus, to access data stored in the memory device, the memory system may navigate through the three subsets to identify the location of a requested page of data. Such an approach may allow for the relatively small first subset to be stored in a volatile memory device of the memory system for fast accesses and updates, but may increase read latency by introducing additional operations, such as two additional reads (e.g., for reading entries in the different subsets of the mapping) to identify the physical address of the data.

Techniques, systems, and devices are described herein for increasing performance and reducing latency associated with using L2P mappings by embedding a pivot table in entries of a second subset of L2P mappings to identify physical addresses of data, thereby bypassing the reading of an entry of a third subset of the L2P mapping. For example, a memory system receive a write command for a set of addresses and determine whether the set of addresses are consecutively indexed. The memory system may set a flag in a pivot table in the entry of the second subset based on the set of addresses being consecutively indexed and write data to the set of addresses in response to setting the flag. The flag may be set in the entry of the second subset to indicate that the entry of the second subset indicates a starting physical address.

In response to receiving a read command that includes an LBA corresponding to the data, the memory system may traverse a first subset of the L2P mapping and the second subset to locate and read the data without accessing a third subset. For example, the memory system may read an entry of a first subset corresponding to the LBA and may identify an entry of the second subset based on the first subset and the LBA. The memory system may read the entry of the second subset, which may include the pivot table. Using the pivot table, the memory system may identify a physical address associated with the LBA and access the data stored at that physical address. The memory system may then transmit the data to a host system coupled with the memory system. In this way, the memory system may reduce latency associated with using L2P mappings to locate data stored at consecutively indexed physical addresses by including the pivot table in the second subset and eliminating the reading of third subset to locate the data.

Features of the disclosure are initially described in the context of systems with reference to FIG. 1. Features of the disclosure are described in the context of diagrams and structures with reference to FIGS. 2-6. These and other features of the disclosure are further illustrated by and described in the context of an apparatus diagram and flowcharts that relate to integrated pivot table in a logical-to-physical mapping with reference to FIGS. 7-9.

FIG. 1 illustrates an example of a system 100 that supports integrated pivot table in a logical-to-physical mapping in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support integrated pivot table in a logical-to-physical mapping. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, during a read operation, the memory system 110 may receive a read command, read an entry of a first subset of a mapping (e.g., a root map of the logical-to-physical mapping), read an entry of a second subset of the mapping (e.g., a global map of the logical-to-physical mapping), and transmit data the host system 105. In such cases, the memory system 110 may read from a pivot table included in the entry of the second subset of the mapping. In some examples, during a write operation, the memory system 110 may receive a write command to write data to continuous physical addresses, write the data to the physical addresses, and set a continuous flag in an entry of the pivot table included in the second subset of the mapping (e.g., global map).

Figure 2:
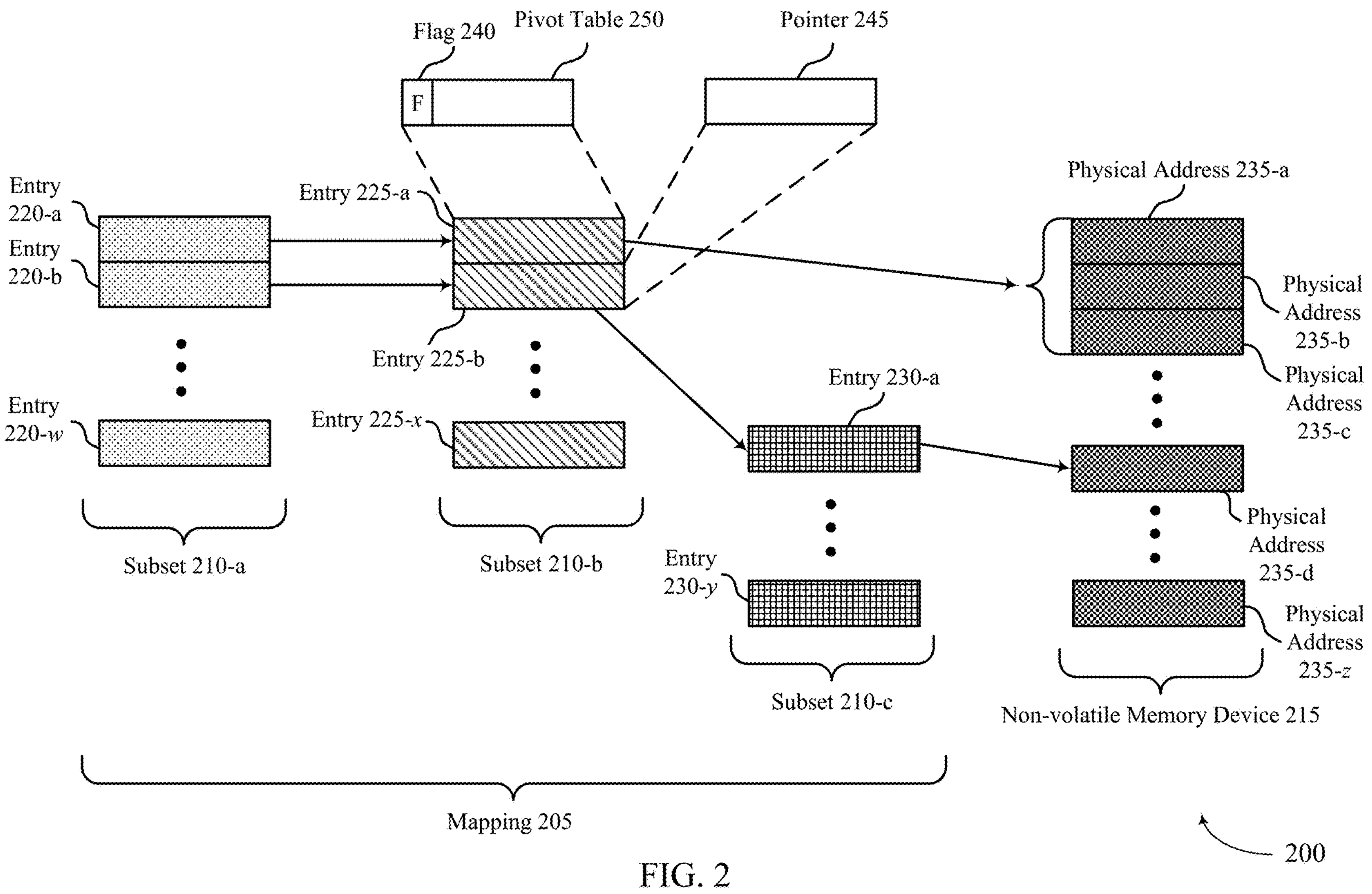
FIG. 2 illustrates an example of an entry diagram that supports integrated pivot table in a logical-to-physical mapping in accordance with examples as disclosed herein.

FIG. 2 illustrates an example of an entry diagram 200 that supports integrated pivot table in a logical-to-physical mapping in accordance with examples as disclosed herein. The entry diagram 200 may implement aspects of a system 100, as described with reference to FIG. 1. For example, the entry diagram 200 may be implemented by a controller, such as a memory system controller 115 or a local controller 135, or a memory device, such as a memory device 130, or both, as described with reference to FIG. 1. The entry diagram 200 may be implemented to reduce latency and power consumption and increase performance of a memory system, among other benefits.

The entry diagram 200 depicts a mapping 205 that may correspond to an L2P mapping as described herein. For example, the mapping 205 may be an example of a hierarchical L2P mapping that is divided into multiple subsets 210. The mapping 205 may include at least a subset 210-*a*, a subset 210-*b*, and a subset 210-*c*. The controller may maintain the mapping 205 to map LBAs generated by a host system coupled with the memory system to physical addresses 235 (e.g., page addresses) of a non-volatile memory device 215 (e.g., a memory device 130 that includes non-volatile memory cells, a NAND device) of the memory system.

The subset 210-*a* may be an example of a root level or root mapping (e.g., first subset of the mapping 205). The subset 210-*a* may include entries 220-*a* up to 220-*w*, where w is some positive integer. In some cases, the subset 210-*a* may include a relatively small quantity of entries 220 (e.g., w may be a relatively small positive integer) such that the controller may store the subset 210-*a* in a volatile memory device (e.g., local memory 120, a memory device 130 that includes volatile memory cells, an SRAM device) of the memory system to allow for faster accesses and updates.

The subset 210-*b* may be an example of global level or global mapping (e.g., second subset of the mapping 205). The subset 210-*b* may include entries 225-*a* up to 225-*x*, where x is some positive integer. In some examples, the subset 210-*b* may include a relatively large quantity of entries 225 (e.g., x may be a relatively large positive integer) such that the controller may store the subset 210-*b* in the non-volatile memory device 215 (e.g., at physical addresses 235 not shown). Accordingly, in order to read an entry 225 of the subset 210-*b*, the controller may transfer a portion of the subset 210-*b* that includes the entry 225 from the non-volatile memory device 215 to the volatile memory device. After reading the entry 225, the controller may transfer the portion of the subset 210-*b* back to non-volatile memory device 215.

The subset 210-*c* may be an example of L2P level or L2P mapping (e.g., third subset of the mapping 205). In some examples, the subset 210-*c* may be an example of physical page table (PPT) level or PPT mapping. The subset 210-*c* may include entries 230-*a* up to 230-*y*, where y is some positive integer. In some examples, the subset 210-*c* may include a relatively large quantity of entries 230 (e.g., y may be a relatively large positive integer) such that the controller may store the subset 210-*c* in the non-volatile memory device 215 (e.g., at physical addresses 235 not shown). Accordingly, in order to read an entry 230 of the subset 210-*c*, the controller may transfer a portion of the subset 210-*c* that includes the entry 230 from the non-volatile memory device 215 to the volatile memory device. After reading the entry 230 the controller may transfer the portion of the subset 210-*c* back to the non-volatile memory device 215.

In some examples, each subset 210 may be an individual L2P mapping table stored in the memory system. For example, the subset 210-*a* may be a first level L2P mapping table that is stored in the volatile memory device. Here, each entry 220 may point to a different second level L2P table. For example, the subset 210-*b* may include multiple second level L2P tables that each include a corresponding set of entries 225. Here, the controller may use an entry 220 and an offset (e.g., indicated by an LBA) to determine the corresponding entry 225 within the second level L2P table pointed to by the entry 220. Additionally, in some cases, each entry 225 may point to a different third level L2P table. For example, the subset 210-*c* may include multiple third level L2P tables that each include a corresponding set of entries 230. Here, the controller may use the entry 225 and a second offset (e.g., indicated by the LBA) to determine the corresponding entry 230 within the third level L2P table pointed to by the entry 225.

For example, the controller may use an LBA to identify an entry 220 of the subset 210-*a*, the entry 220 to identify an entry 225 of the subset 210-*b*, the entry 225 to identify an entry 230 of the subset 210-*c*, and the entry 230 to identify a physical address 235 corresponding to the LBA. That is, to identify the corresponding physical address 235, the controller may, in some cases, traverse the first level, second level, and third level of the mapping 205. However, traversing the three levels of the mapping 205 may include transferring portions of the subsets 210-*a*, 210-*b*, and 210-*c* to the volatile memory device to read various entries. Each entry of the mapping 205 that is read and portion of a subset 210 that is transferred may increase a latency associated with using the mapping 205 (e.g., to identify the corresponding physical address 235). Accordingly, techniques to reduce a quantity of entries of the mapping 205 that are read and portions of subsets 210 that are transferred may reduce the latency associated with the using the mapping 205.

The controller may reduce a quantity of entries of the mapping 205 that are read and, by extension, a quantity of portions of subsets 210 that are transferred to the volatile memory device by setting an entry 225 to indicate a physical address 235 rather than an entry 230. For example, if data stored in a set of physical addresses 235 are consecutively indexed, the controller may set an entry 225 to indicate a starting physical address 235 of the set of consecutively indexed physical addresses 235. For example, data corresponding to a first LBA may be stored at a set of consecutively indexed physical addresses 235 that includes at least a physical address 235-*a*, a physical address 235-*b*, and a physical address 235-*c*, where the physical address 235-*a* is a starting physical address of the set of consecutively indexed physical addresses 235.

The controller may set an entry 225-*a* to indicate the physical address 235-*a*. For example, the entry 225-*a* may include a flag 240 and at least a portion of a pivot table 250. The flag 240 may indicate whether the entry 225 is associated with an entry 230 of the subset 210-*c* or is associated with a starting physical address 235 of a set of consecutively indexed physical addresses 235. The pivot table 250 may include a plurality of entries where an entry of the plurality of entries represents a plurality of logical block addresses that are consecutively indexed and the instructions to identify a starting physical address 235 of a plurality of physical addresses 235 that are consecutively indexed. To address an increased quantity of data associated with the host system (e.g., user data) able to fit within the mapping 205 (e.g., in 1 MB), the controller may determine whether the data includes sequential data. For example, the controller may determine whether the blocks may be written logically and physically in sequential order (e.g., consecutively indexed).

Based on the flag 240 and the pivot table 250, the physical address of entry 225-*a* may correspond to either a physical address of the entry 230 or the starting physical address 235-*a*. Accordingly, in the example of FIG. 2, the controller may set the flag 240 of the entry 225-*a* to indicate that the entry 225-*a* corresponds to the set of consecutively indexed physical addresses 235. Additionally, the controller may read of the entry 225-*a* (e.g., including the entry of the pivot table 250) to indicate the starting physical address 235-*a*. In this way, the controller may set the entry 225-*a* to refrain from (e.g., skip) reading and transferring a portion of the subset 210-*c* that includes an entry 230. For example, controller may receive a read command that includes the first LBA (e.g., from the host system). The controller may use the first LBA to identify and read the entry 220-*a*, which the controller may use to identify and read the entry 225-*a*. The controller may determine that the pivot table 250 indicates the starting physical address 235-*a* based on the flag 240 and may read the data corresponding to the first LBA starting at the physical address 235-*a*. The controller may then transmit the data to the host system.

In some cases, the LBA used to identify an entry 220 of the subset 210-*a* (e.g., and subsequently an entry 225 of the subset 210-*b*) may not correspond to the physical addresses in the pivot table 250. In such cases, the pivot table 250 may indicate a starting physical address 235 that corresponds to a starting LBA. For example, the controller may determine a difference between the LBA in the command and the starting LBA. The controller may then use the determined difference between the LBA and the starting LBA to identify the physical address 235. For example, the controller may combine the difference between the LBAs with the starting physical address stored in the pivot table to determine the desired physical address. In some examples, the controller may use an entry 220 and an offset (e.g., a difference between the LBA and the starting LBA) to determine the corresponding entry 225 within the second level L2P table pointed to by the entry 220. The controller may use the entry 225 and a second offset (e.g., a difference between the LBA and the starting LBA) to determine the corresponding entry 230 within the third level L2P table pointed to by the entry 225.

To increase the range of LBAs that may be addressed by the mapping 205, the system may integrate a pivot table 250 into the mapping 205. For example, the pivot table 250 may be generated and integrated into subset 210-*b* of the mapping 205. In such cases, by embedding the pivot table 250 into subset 210-*b*, the range of LBAs that may be addressed by the controller without accessing the NAND may increase, thereby improving the overall performance of the system and decreasing latencies. In some examples, a pivot table may be an example of a data structure or mapping that summarizes or compresses information associated with a more extensive data structure or mapping. In some cases, the pivot table may be an example of a condensed version of the physical addresses associated with the memory system.

Alternatively, data may be stored at a set of physical addresses 235 that includes one or more physical addresses 235 that are non-consecutive with other physical addresses 235 of the set. For example, data corresponding to a second LBA may be stored at a set of physical addresses 235 that includes at least a non-consecutive physical address 235-*d*. Accordingly, the controller may identify the pointer 245 to indicate that the entry 225-*b* is associated with (indicates the physical address of) an entry 230 (e.g., an entry 230-*a*). Additionally, the controller may identify the pointer 245 of the entry 225-*b* to indicate (e.g., to include the physical address of) the entry 230-*a* and may set the entry 230-*a* to indicate the physical address 235-*d*. In such cases, the controller may refrain from setting the flag 240. The controller may read a second entry (e.g., entry 225-*b*) that includes the pointer 245 and represents the logical block address that is non-consecutively indexed with other logical block addresses.

Accordingly, in response to receiving a read command that includes the second LBA, the controller may use the second LBA to identify and read the entry 220-*b* which the controller may use to identify and read the entry 225-*b*. The controller may determine that the pointer 245 indicates the physical address of the entry 230-*a*. Accordingly, the controller may identify and read the entry 230-*a* to identify the physical address 235-*d* and read the data corresponding to the second LBA stored at the physical address 235-*d*. The controller may then transmit the data to the host system.

In some cases, the range of LBA's that may be addressed from the controller without having to fetch (e.g., retrieve) the L2P map from NAND to determine where data may be stored may be increased. In some systems, one (1) GB addressing range may utilize one (1) MB of embedded SRAM to store a quantity of L2P maps (e.g., 1024 KB divided by 4 B multiplied by 4 KB). To expand (e.g., increase the addressing range), the system may increase the mapped data size from 4 KB to 512 KB.

In some examples, an entry 230 of the subset 210-*c* may be 4 B size and managed as 4 KB units on a 2048 GB device, as illustrated in Table 1.

TABLE 1

| Mapping Subset | Physical Table Size | Cache Size | Type | Record Size | Mapping Region |
|---|---|---|---|---|---|
| Subset 210-a | 2 KB | 2 KB | Static | 4 B | 4 GB |
| Subset 210-b | 2 MB | 8-32 KB | Static | 4 B | 4 MB |
| Subset 210-c | 2 GB | 256-1024 KB | Dynamic | 4 B | 4 KB |

The physical table size to support a 2048 GB drive may include 2 KB of subset 210-*a* (e.g., 512 entries (e.g., entries 220) multiplied by 4B (e.g., the record size)). The physical table size to support a 2048 GB drive may include 2 MB of subset 210-*b* (e.g., 512 entries multiplied by 1024 entries (e.g., entries 225) multiplied by 4B). The physical table size to support a 2048 GB drive may include 2 GB of subset 210-*c* (e.g., 512 entries multiplied by 1024 entries multiplied by 1024 entries (e.g., entries 230) multiplied by 4B). The L2P cache (e.g., subset 210-*c*) addressing range may be 1 GB (e.g., 1024 KB divided by 4B entries multiplied by 4 KB). In other examples, an entry 230 of the subset 210-*c* may be 4B size and managed as 4 KB units on a 2048 GB device, as illustrated in Table 2.

TABLE 2

| Mapping Subset | Physical Table Size | Cache Size | Type | Record Size | Mapping Region |
|---|---|---|---|---|---|
| Subset 210-a | 16 KB | 16 KB | Static | 4 B | 0.5 GB |
| Subset 210-b | 16 MB | 8-32 KB | Static | 4 B | 0.5 MB |
| Subset 210-c | 2048 MB | 256-1024 KB | Dynamic | 4 B | 4 KB |

In some examples, the size of the subset 210-*c* may be 1024 KB (e.g., LBAs), the range of the pivot table 250 included in the subset 210-*b* may be 128 (e.g., LBAs), and the pivot per PPT may be 8 (e.g., 1024 entries (size of the subset 210-*c*) divided by 128 pivot range (e.g., the range of the pivot table 205)). The physical table size to support a 2048 GB drive may include 16 KB of subset 210-*a* (e.g., 512 entries 220 multiplied by 8 (e.g., the pivot per table) multiplied by 4B (e.g., the record size)). The physical table size to support a 2048 GB drive may include 16 MB of subset 210-*b* (e.g., 512 entries 220 multiplied by 8 (e.g., pivot per table) multiplied by 1024 entries 225 multiplied 4B (e.g., the record size)). The physical table size to support a 2048 GB drive may include 2048 MB of subset 210-*c* (e.g., 512 entries 220 multiplied by 1024 entries 225 multiplied by 1024 entries 230 multiplied by 4B (e.g., the record size)). The global cache (e.g., subset 210-*b*) addressing range (e.g., of direct data) may be 128 GB (e.g., 1 MB divided by 4 B entries 225 multiplied by the 128 (e.g., range of the pivot table 250) multiplied by 4 KB). The L2P cache (e.g., subset 210-*c*) addressing range may be 1 GB (e.g., 1 MB divided by 4 B entries 225 multiplied by 4 KB).

By integrating the pivot table 250 into the subset 210-*b*, the size of the mapping may increase from 2 MB to 16 MB for subset 210-*b*. In such cases, the subset 210-*b* may store an increased quantity of pointers. The mapping region granularity of subset 210-*b* may be updated from 4 MB to 0.5 MB (e.g., 512 KB). By increasing the size of subset 210-*b*, the system may address an increased quantity of data. Instead of addressing 1 GB of address space, if the controller determines that the physical address are sequential (e.g., consecutively indexed), the controller may address 128 GB of address space.

Figure 3:
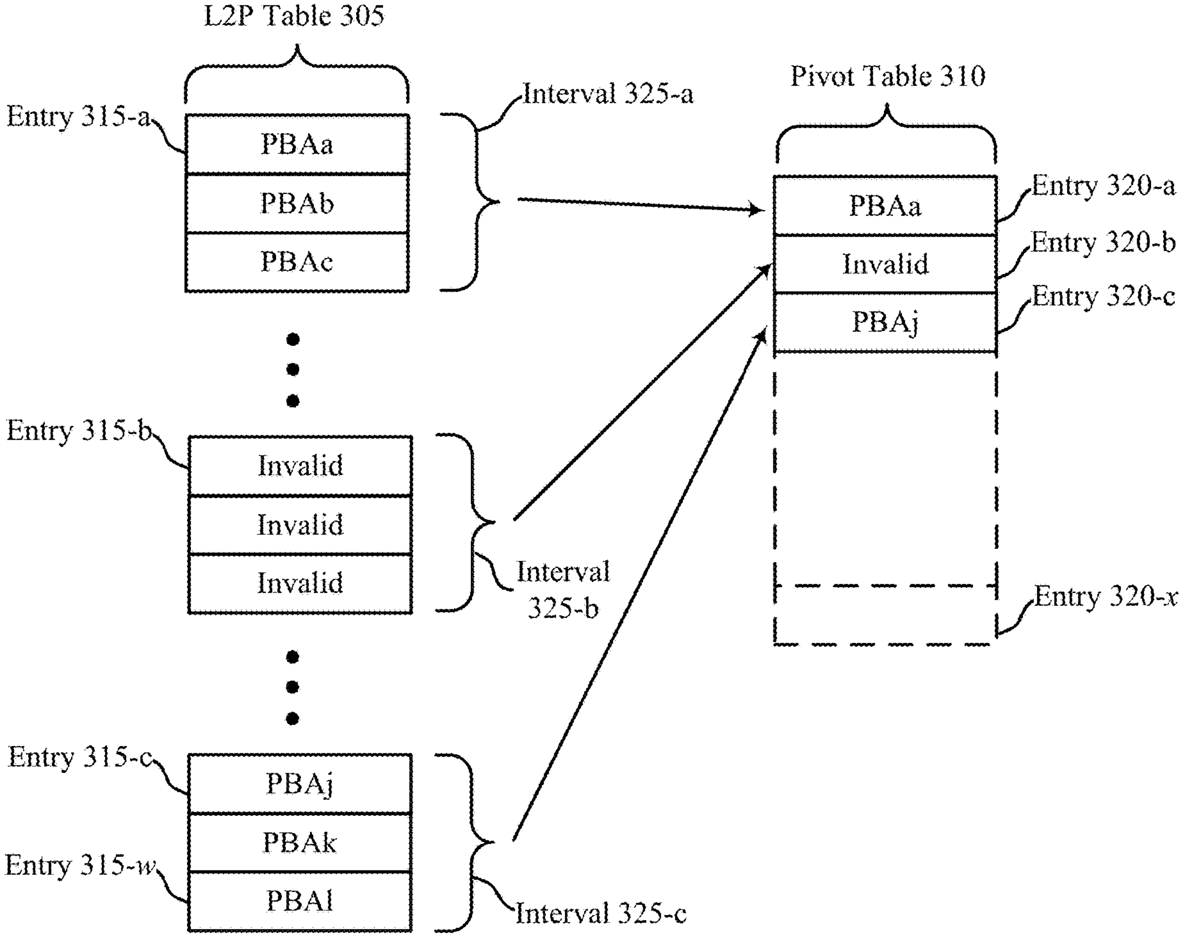
FIG. 3 illustrates an example of a pivot table structure that supports integrated pivot table in a logical-to-physical mapping in accordance with examples as disclosed herein.

FIG. 3 illustrates an example of pivot table structures 300 that supports integrated pivot table in a logical-to-physical mapping in accordance with examples as disclosed herein. The pivot table structures 300 may implement aspects of a system 100 and entry diagram 200, as described with reference to FIGS. 1 and 2. For example, the pivot table structures 300 may be implemented by a controller, such as a memory system controller 115 or a local controller 135, or a memory device, such as a memory device 130, or both, as described with reference to FIG. 1. The pivot table structures 300 may be implemented to reduce latency and power consumption and increase performance of a memory system, among other benefits.

The pivot table structures 300 may include L2P table 305 and pivot table 310. The L2P table 305 may include entries 315-*a* up to 315-*w*, where w is some positive integer. For example, w may be 1024 where the L2P table 305 may include 1024 entries 315. Each entry 315 of the L2P table 305 may include physical addresses and point to 4 K entries. The L2P table 305 may include intervals 325 where each interval 325 includes a quantity of entries 315. For example, each interval 325 may include 128 entries 315. In such cases, the entries 315 (e.g., sampled physical address values) may be selected at 128 intervals 325. The quantity of entries 315 in the interval 325 (e.g., 128) may be an example of a pivot range. In some cases, the L2P table 305 may be an example of a PPT.

In some cases, the physical addresses in each of the 128 chunks (e.g., intervals 325) may include sequential data and may be either invalid or valid data. For example, the entry 315-*a* of interval 325-*a* may include sequential, valid data. The entry 315-*b* of interval 325-*b* may include sequential, invalid data. The memory system may store the first entry 315 (e.g., physical address) for each interval 325 in the pivot table 310 which may enable the memory system to retrieve the relevant information from the mapping.

The pivot table 310 may include a plurality of entries 320 up to 320-*x*, where x is some positive integer. For example, x may be 8 where the pivot table 310 may include 8 entries 320. The quantity of entries 320 in the pivot table 310 may be an example of a pivot per physical page table. To generate the pivot table 310, the memory system may include a first entry 315 from each interval 325 of the L2P table 305. For example, the pivot table 310 may include at least the first entry 315-*a* of the first interval 325-*a*, the first entry 315-*b* of the second interval 325-*b*, and the first entry 315-*c* of the third interval 325-*c*. In such cases, the pivot table 310 may include the first entry 315 of each of the eight intervals 325 of the L2P table 305. In some cases, the memory system may include a pivot table 310 for each L2P table 305 or a segment of the L2P table 305.

In some cases, the entry 320-*a* (e.g., including the first entry 315-*a* of the first interval 325-*a*) may represent a plurality of logical block addresses that are consecutively indexed and the instructions to identify a starting physical address of a plurality of physical addresses that are consecutively indexed. The physical addresses may correspond to the logical block addresses. In some examples, the entry 320-*b* (e.g., including the first entry 315-*b* of the second interval 325-*b*) may represent a plurality of logical block addresses that include invalid data. The pivot table 310 may summarize information about physical addresses in 128 entry chunks (e.g., intervals 325).

The memory system may receive a request to perform a read or write operation and generate the pivot table 310. To generate the pivot table 310, the memory system may replace an entry of the second subset of mapping (e.g., global level or global mapping) with the pivot table 310. In some systems, the first entry of the second subset of mapping may include a pointer. In such cases, the memory system may replace the pointer with the at least a portion of the pivot table 310. The memory system may store the pivot table in the entry of the second subset of the mapping in response to receiving write commands.

For example, the pivot table 310 may be embedded within the second subset of the mapping. In such cases, the memory system may receive a read command associated with a first logical block address. The memory system may read an entry (e.g., entry 320-*a*) of the pivot table 310 included in the second subset of the mapping, and the entry 320-*a* may indicate whether the address is a starting physical address of a plurality of physical addresses that are consecutively indexed or associated with a third subset of the mapping. The memory system may retrieve and transmit data based on the entry 320-*a* of the pivot table 310.

The memory system may convert logical block addresses to physical addresses using the L2P table 305. The size of the L2P table 305 may be greater than a size that may be maintained in the system on chip (SoC) memory. In such cases, a subset of the L2P table 305 may be stored in the memory and the remaining subsets of the L2P table 305 may be stored in the NAND. The subsets of the L2P table 305 may include sequentially written LBAs. In such cases, the memory system may generate a compressed representation of the L2P table 305 based on the sequentially written data. The pivot table 310 may include the compressed subset of the L2P table 305 and may be stored in SoC memory. In some cases, a bitmap pivot table may be used to verify that the logical block address has been written in a continuous sequence of physical addresses or whether it has been written out of sequence by random writes.

The bitmap pivot table may be generated by starting with the value of the pivot table 310 as a base of "expected physical addresses" and use that to compare with the range of corresponding values in the L2P table 305. If the value from the L2P table 305 may be in line with the sequence of "expected physical addresses" by the pivot table 310, the associated bit in the bitmap pivot table may be set. If the L2P table 305 value fails to follow the sequence, the bitmap pivot table may be cleared to 0. In some cases, the pivot table 310 entry 320-*b* may include invalid data. In such cases, the bitmap pivot table for the 128 logical block address sequence (e.g., interval 325-*b*) may be cleared to 0. The bitmap pivot table may include a bit for each of the 128 logical block addresses represented by an entry 320 of the pivot table 310.

Each entry 320 of the pivot table 310 may represent a group of 128 logical block addresses where the value of the first physical address (e.g., entry 315-*a*) may be recorded as the entry 320-*a* of the pivot table 310. The first entry 320-*a* of the pivot table 310 may include a consecutively written set of physical addresses. In such cases, the bitmap pivot table may be written with 1's. The second entry 320-*b* of the pivot table 310 may include invalid data. In such cases, the bitmap pivot table may be written with 0's. The third entry 320-*c* may include a combination of sequentially written physical addresses and random physical addresses. In such cases, the bitmap pivot table may be written with a combination of 1's and 0's.

In some examples, the memory system may identify an entry 320 (e.g., PBA(n)) from LBA(n) by using a starting LBA (e.g., LBA(0)) and the starting physical address (e.g., entry 320-*a*) stored in the pivot table 310. The entry 320-*a* may be an example of PBA(0). For example, the memory system may determine a difference between the LBA(n) and the starting LBA (e.g., LBA(0)). The difference may be used to identify the entry 320 (e.g., PBA(n)). In such cases, by compressing the data, the memory system may perform an algorithm to determine the physical address of entry 320.

Figure 4:
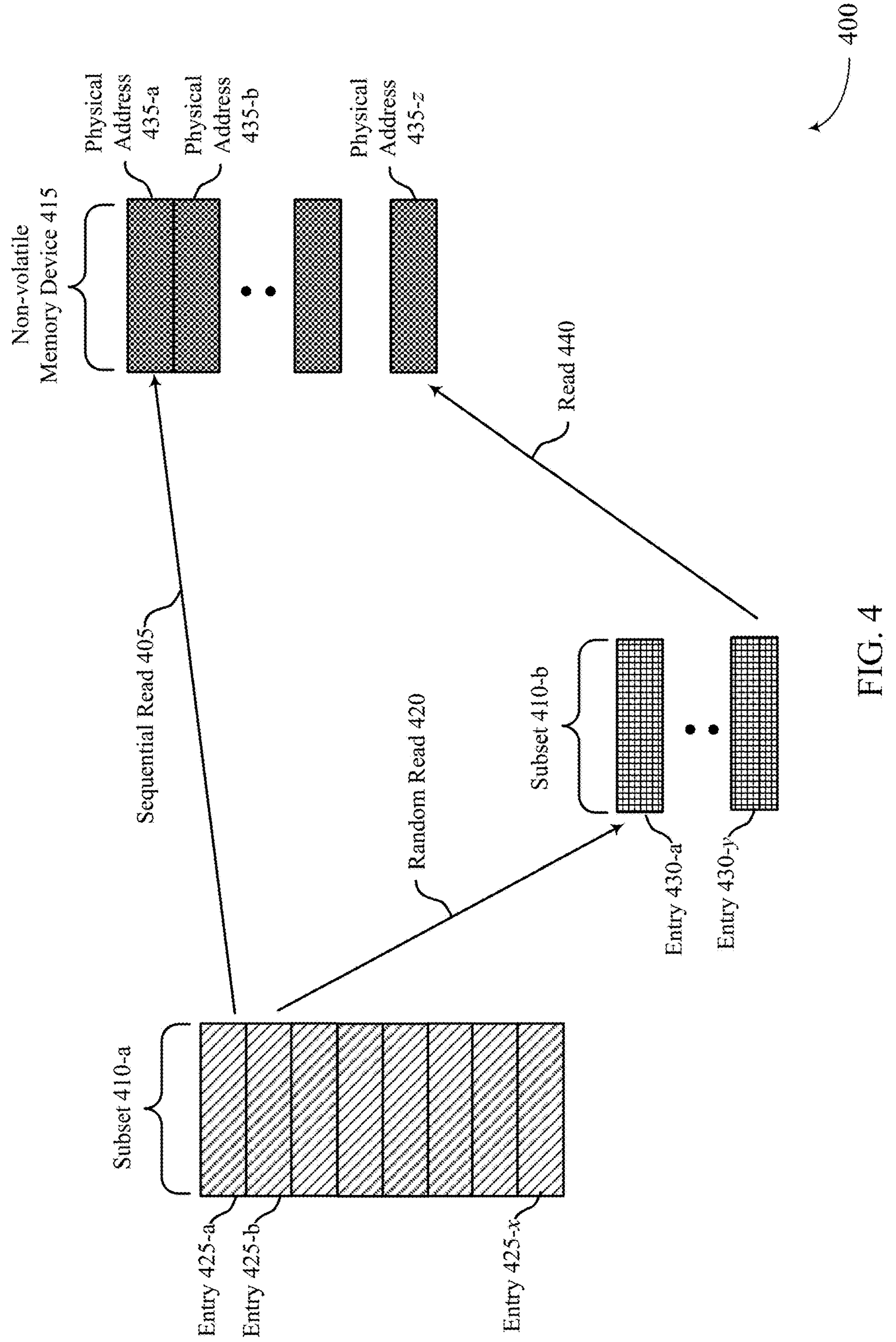
FIG. 4 illustrates an example of a read diagram that supports integrated pivot table in a logical-to-physical mapping in accordance with examples as disclosed herein.

FIG. 4 illustrates an example of a read diagram 400 that supports integrated pivot table in a logical-to-physical mapping in accordance with examples as disclosed herein. The read diagram 400 may implement aspects of the systems, as described with reference to FIGS. 1-3. For example, the read diagram 400 may be implemented by a controller, such as a memory system controller 115 or a local controller 135, or a memory device, such as a memory device 130, or both, as described with reference to FIG. 1.

The read diagram 400 depicts an operation which may correspond to a read operation as described hereon. The read diagram 400 may include at least a subset 410-*a*, subset 410-*b*, and non-volatile memory device 415, which may be examples of subset 210-*b*, subset 210-*c*, and non-volatile memory device 215 as described with reference to FIG. 2. The subset 410-*a* may be an example of pivot table 310 as described with reference to FIG. 3.

The subset 410-*a* may be an example of global level or global mapping (e.g., second subset of the mapping). The subset 410-*a* may include entries 425-*a* up to 425-*x*, where x is some positive integer. For example, the subset 410-*a* may include 8 entries 425. The subset 410-*b* may be an example of L2P/PPT level or mapping (e.g., third subset of the mapping). The subset 410-*b* may include entries 430-*a* up to 430-*y*, where y is some positive integer. The non-volatile memory device 415 may include physical addresses 435-*a* up to 435-*z*, where z is some positive integer.

In some cases, each entry 425 may point to subset 410-*b* or the non-volatile memory device 415. For example, the entry 425 may point to the non-volatile memory device 415. Data corresponding to a first LBA may be stored at a set of consecutively indexed physical addresses 435 that includes at least a physical address 435-*a* and a physical address 435-*b*, where the physical address 435-*a* is a starting physical address of the set of consecutively indexed physical addresses 435. The memory system may set an entry 425-*a* to indicate the physical address 435-*a*. For example, the entry 425-*a* may indicate a starting physical address 435 of a set of consecutively indexed physical addresses 435. In such cases, the entry 425-*a* may correspond to the set of consecutively indexed physical addresses 435.

The memory system may perform sequential read 405 to read the entry 425-*a* (e.g., including the entry of the pivot table) to indicate the starting physical address 435-*a*. In this way, the memory system may set the entry 425-*a* to refrain from (e.g., skip) reading and transferring a portion of the subset 410-*b* that includes an entry 430. For example, the memory system may receive a read command that includes the first LBA (e.g., from the host system). The memory system may use the first LBA to identify (e.g., read) the entry 425-*a*. The memory system may determine that the entry 425-*a* indicates the starting physical address 435-*a* and may read the data corresponding to the first LBA starting at the physical address 435-*a*. The memory system may then transmit the data to the host system.

In other examples, the memory system may use the LBA to identify (e.g., read) the entry 425 where the entry 425 may not be a starting physical address (e.g., may not indicate the starting physical address 435-*a*). For example, if the LBA in the read command is LBA(n) where n is greater than zero (0) (e.g., not the starting LBA), then the memory system may identify PBA(n) using PBA(0) and the LBA(n). The memory system may read the data corresponding to the LBA starting at the physical address 435 (e.g., PBA(n)). In such cases, the physical address may correspond to the logical block address.

In some examples, the entry 425 may point to the non-volatile memory device 415. In such cases, data may be stored at a set of physical addresses 435 that includes one or more physical addresses 435 that are non-consecutive with other physical addresses 435 of the set. For example, data corresponding to a second LBA may be stored at a set of physical addresses 435 that includes at least a non-consecutive physical address 435-*z*. The memory system may identify that the entry 425-*b* is associated with (indicates the physical address of) an entry 430 (e.g., an entry 430-*a*). The memory system may set the entry 430-*a* to indicate the physical address 435-*z*.

In some examples, the memory system may use the entry 425-*b* and an offset (e.g., indicated by the LBA) to determine the corresponding entry 230 within the subset 410-*b* pointed to by the entry 425-*b*. In such cases, the memory system may use the entry 425-*b* to identify an entry 430 of the subset 410-*b*, and the entry 430 to identify a physical address 435 corresponding to the LBA. The physical address of entry 425-*b* may correspond to a physical address of the entry 430 (e.g., entry 430-*a*). The memory system may read a second entry (e.g., entry 425-*b*) that represents the logical block address that is non-consecutively indexed with other logical block addresses. The memory system may identify and perform random read 420 to read the entry 430-*a* to identify the physical address 435-*z* and then perform read 440 to read the data corresponding to the second LBA stored at the physical address 235-*z*. The memory system may then transmit the data to the host system.

In some system, subset 410-*a* may include a single pointer. By embedding the pivot table within the subset 410-*a* quantity of pointers may be increased from a single pointer to 8 pointers (e.g., 8 entries 425). For example, the entry 425-*a* may point to non-volatile memory device 415 and the entry 425-*b* may point to subset 410-*b*. In such cases, the subset 410-*a* may include a hybrid of pointers that may point to subset 410-*b* or non-volatile memory device 415. The granularity of the subset 410-*a* may be reduced from each entry 425 pointing to 4 MB to each entry 425 pointing to 512 KB, thereby increasing the overall performance of the memory system. In such cases, each of the 8 entries 425 points to 512 KB which equals a total of 4 MB that the subset 410-*a* points to.

To expand the addressable range of logical block addresses, each 4 MB pointer of the subset 410-*a* may be replaced with a pivot table segment. The pivot table entries defined by the pivot table range may divide each 4 MB physical address of the subset 410-*a* into multiple entries 425 that may point directly to sequential data in the NAND or to L2P mapping stage (e.g., subset 410-*b*) if the data is random. For example, the size of the PPT (e.g., 1024 entries) divided by the pivot range (e.g., 128 entries within each interval) equals a quantity of entries 425 (e.g., 8 entries 425) in the subset 410-*a*.

The data may be compressed by each 4 B entry in the subset 410-*a* pointing directly to sequential data in the NAND (e.g., non-volatile memory device 415) while the analogous L2P map entries may be unused. For example, if each entry 425 in the subset 410-*a* represents 512 KB, then the compression ratio is 128:1. The data compression may be expressed by a quantity of mapped logical block addresses in 1 MB of controller SRAM buffer. A lower limit of a size of mapped logical block addresses may be equal to 1 MB divided by 4 B physical addresses multiplied by the pivot range (e.g., 128) multiplied by 4 KB. In such cases, the lower limit of the size of mapped logical block addresses may be 128 GB. For example, each 4 B physical address may point to 512 KB of sequential data. The quantity of mapped logical block addresses may be data dependent.

If the sequence of logical block addresses may not be sequentially written into the NAND, the entry 425 of subset 410-*a* may point to the subset 410-*b*, and the memory system may fetch the L2P from the NAND (e.g., non-volatile memory device 415). In some cases, a 512 KB pivot range may be used for the tracking of sequential data.

The read command associated with the sequential read 405 may directly address the NAND, and the sequential physical address stored in the subset 410-*a* may be incremented by one to read the associated data. The read command associated with the random read 420 may be associated with non-sequential physical addresses, and the memory system may fetch (e.g., retrieve) the associated L2P level map (e.g., subset 410-*b*) to directly address the data of non-volatile memory device 415 associated with a host system.

Figure 5:
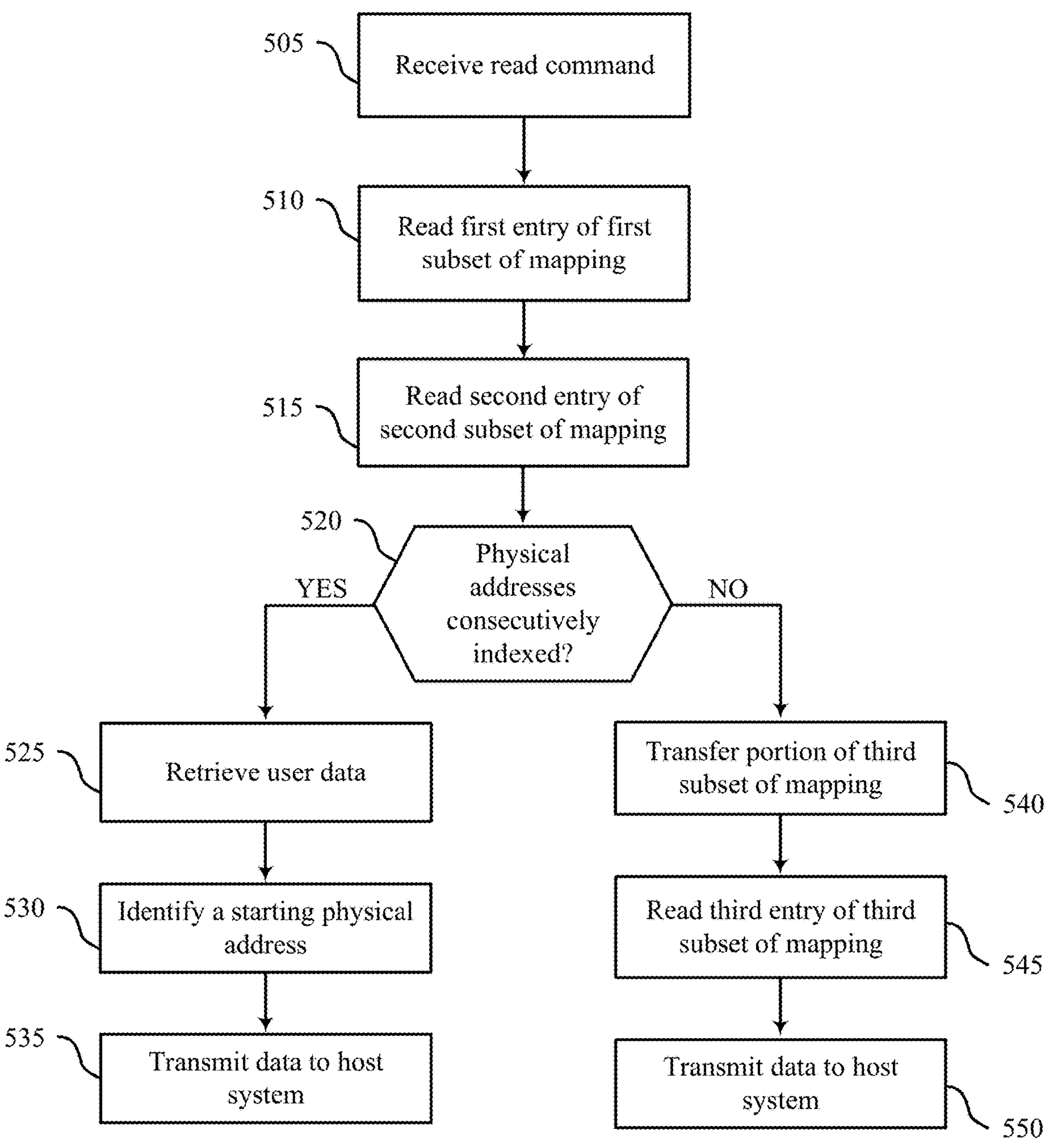
FIG. 5 illustrates an example of a flow diagram that supports integrated pivot table in a logical-to-physical mapping in accordance with examples as disclosed herein.

FIG. 5 illustrates an example of a flow diagram 500 that supports integrated pivot table in a logical-to-physical mapping in accordance with examples as disclosed herein. The operations of flow diagram 500 may be implemented by any device or its components as described herein. For example, the operations of flow diagram 500 may be performed by a memory system as described with reference to FIG. 1. Alternative examples of the following may be implemented, where some steps are performed in a different order or not at all. Some steps may additionally include additional features not mentioned below. The flow diagram 500 illustrates techniques where a memory system may use integrated pivot table in a logical-to-physical mapping for a read operation.

Aspects of the flow diagram 500 may be implemented by a controller, among other components. Additionally or alternatively, aspects of the flow diagram 500 may be implemented as instructions stored in a controller (e.g., controller coupled with the memory system). For example, the instructions, when executed by a controller (e.g., the memory system controller 115), may cause the controller to perform the operations of the flow diagram 500.

At 505, a read command may be received. For example, the memory system may receive a read command. The read command may include a logical block address of a non-volatile memory device. At 510, a first entry may be read. For example, the memory system may read, based at least in part on the logical block address, a first entry of a first subset of a mapping. In some cases, the first entry may define a relationship between the logical block address and a physical address. The first subset of the mapping may be an example of a root mapping or root level.

At 515, a second entry may be read. For example, the memory system may read, based at least in part on reading the first entry of the first subset, a second entry of a second subset of the mapping. In some cases, the second entry may include at least a portion of a pivot table associated with physical addresses of the non-volatile memory device. The second subset of the mapping may be an example of a global mapping or global level.

In some examples, the second entry of the second subset may include a flag that indicates whether the second entry is associated with a third subset of the mapping or is associated with a starting physical address of a set of physical addresses associated with the read command. The third subset of the mapping may be an example of a L2P mapping or L2P level. In other examples, the third subset of the mapping may be an example of a PPT mapping or PPT level. In some cases, the pivot table of the second subset of the mapping may include a flag that indicates whether the physical addresses are consecutively indexed (e.g., continuous).

The pivot table may include a plurality of entries where an entry of the plurality of entries may represent a plurality of logical block addresses that are consecutively indexed. In such cases, an entry of the pivot table may identify a starting physical address of a plurality of physical addresses that are consecutively indexed. The plurality of physical addresses may correspond to the plurality of logical block addresses. In some examples, the memory system may read the second entry of the second subset of the mapping by reading the entry of the plurality of entries. For example, the memory system may read a first entry (e.g., segment of the pivot table). In some cases, the entry in the pivot table may point to the third level of the mapping (e.g., L2P table or PPT).

At 520, a determination may be made. For example, the memory system may determine whether the physical addresses of the set of physical addresses are consecutively indexed in response to reading the second entry of the second subset of the mapping. In such cases, the memory system may determine whether the physical addresses associated with the read command are continuous and determine whether the flag is set based on the physical addresses being continuous. In some examples, the memory system may determine that the physical addresses are consecutively indexed.

At 525, user data may be retrieved. For example, the memory system may retrieve, from the non-volatile memory device, the data from the physical address identified using the pivot table of the second entry in direct response to determining that the physical addresses are consecutively indexed. The data may be retrieved from the physical address without reading a third subset of the mapping. In some examples, the data may correspond to user data from the non-volatile memory device.

In some cases, the memory system may refrain from reading a third entry of a third subset of the mapping based on a flag indicating that the second entry of the second subset of the mapping is associated with the physical addresses of the non-volatile memory device. The memory system may refrain from transferring, from the non-volatile memory device to a volatile memory device, at least a portion of a third subset of the mapping based on a flag indicating that the second entry of the second subset of the mapping is associated with the physical addresses of the non-volatile memory device. In such cases, the memory system may refrain from reading the third subset of the mapping or refrain from loading the third subset of the mapping in response to determining that the physical addresses are consecutively indexed or both.

At 530, a starting physical address may be identified. For example, the memory system may identify a starting physical address of a plurality of physical addresses that are consecutively indexed using the pivot table of the second entry. The memory system may identify the physical address to access based on a starting logical block address and a difference between the starting logical block address and the logical block address. In such cases, the memory system may identify a starting address and determine an offset.

At 535, data may be transmitted. For example, the memory system may transmit, to a host system, data retrieved from the physical address identified in the pivot table of the second subset of the mapping in response to reading the second entry of the second subset of the mapping. In some cases, transmitting the data may be in direct response to determining that the physical addresses are consecutively indexed and retrieving the data.

In some examples, the memory system may determine that the physical addresses are not consecutively indexed (e.g., random). In such case, at 540, a portion of the third subset may be transferred. For example, the memory system may transfer, from the non-volatile memory device to a volatile memory device, at least a portion of a third subset of the mapping based on a flag indicating that the second entry of the second subset of the mapping is associated with the physical addresses of the non-volatile memory device. In such cases, the memory system may transfer, to a volatile memory device, at least the portion of the third subset of the mapping in direct response to determining that the physical addresses are not consecutively indexed.

At 545, a third entry may be read. For example, the memory system may read a third entry of a third subset of the mapping based on a flag indicating that the second entry of the second subset of the mapping is associated with the physical addresses of the non-volatile memory device. The memory system may read the third entry of the third subset in response to transferring the portion of the third subset of the mapping.

At 550, data may be transmitted. For example, the memory system may transmit, to a host system, data retrieved from the physical address identified in the pivot table of the second subset of the mapping in response to reading the third entry of the third subset of the mapping.

Figure 6:
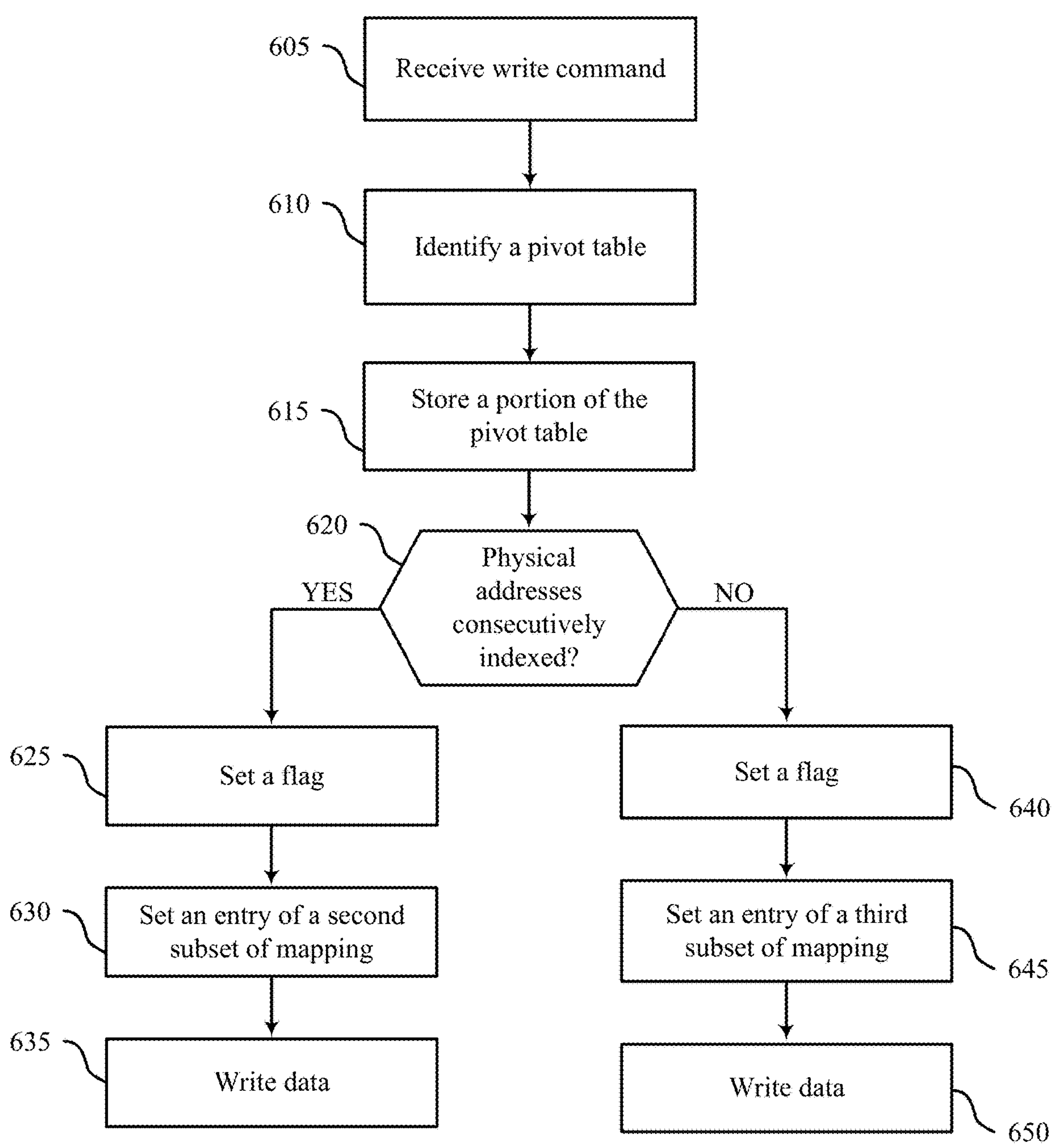
FIG. 6 illustrates an example of a flow diagram that supports integrated pivot table in a logical-to-physical mapping in accordance with examples as disclosed herein.

FIG. 6 illustrates an example of a flow diagram 600 that supports integrated pivot table in a logical-to-physical mapping in accordance with examples as disclosed herein. The operations of flow diagram 600 may be implemented by any device or its components as described herein. For example, the operations of flow diagram 600 may be performed by a memory system as described with reference to FIG. 1. Alternative examples of the following may be implemented, where some steps are performed in a different order or not at all. Some steps may additionally include additional features not mentioned below. The flow diagram 600 illustrates techniques where a memory system may use integrated pivot table in a logical-to-physical mapping for a write operation.

Aspects of the flow diagram 600 may be implemented by a controller, among other components. Additionally or alternatively, aspects of the flow diagram 600 may be implemented as instructions stored in a controller (e.g., controller coupled with the memory system). For example, the instructions, when executed by a controller (e.g., the memory system controller 115), may cause the controller to perform the operations of the flow diagram 600.

At 605, write commands may be received. For example, the memory system may receive a plurality of write commands for a set of physical addresses of a non-volatile memory device. At 610, a pivot table may be identified. For example, the memory system may identify that the pivot table is included in the second subset of the mapping in response to receiving the plurality of write commands. In such cases, the pivot table may be identified in the global map or global level. The memory system may generate the pivot table to be included in the second subset of the mapping in direct response to receiving the plurality of write commands. In some cases, the memory system may replace the entry of the second subset of the mapping that includes a pointer with at least the portion of the pivot table. For example, the pointer of the second subset of the mapping may be replaced with the pivot table.

The pivot table may include a plurality of entries where a first entry of the plurality of entries may represent a plurality of logical block addresses that are consecutively indexed. The pivot table may identify a starting physical address of a plurality of physical addresses that are consecutively indexed where the plurality of physical addresses correspond to the plurality of logical block addresses.

At 615, the pivot table may be stored. For example, the memory system may store at least the portion of the pivot table in the entry of the second subset of the mapping in response to receiving the plurality of write commands. In some examples, the memory system may store the portion of the pivot table in response to generating the pivot table, identifying the pivot table, replacing the pointer with the pivot table, or a combination thereof.

At 620, a determination may be made. For example, the memory system may determine whether the set of physical addresses are consecutively indexed in response to receiving the plurality of write commands. In some cases, the memory system may determine that the set of physical addresses are consecutively indexed.

At 625, a flag may be set. For example, the memory system may set, based on the set of physical addresses being consecutively indexed, a flag in an entry of a second subset of a mapping. The mapping may include a first subset (e.g., root mapping or root level), the second subset, and a third subset (e.g. L2P table or L2P level). The memory system may set the flag in the entry in direct response to determining that the physical addresses are consecutively indexed. The entry of the second subset includes at least a portion of a pivot table associated with the set of physical addresses. In some case, the flag may indicate that the entry is associated with a starting physical address of the set of physical addresses associated with the plurality of write commands.

The memory system may set the flag in response to identifying the pivot table, generating the pivot table, replacing the entry, storing at least the portion of the pivot table, or a combination thereof.

At 630, an entry may be set. For example, the memory system may set the entry of the second subset of the mapping to indicate a starting physical address in response to determining that the set of physical addresses are consecutively indexed. In such cases, the memory system may set the entry of the second subset of the mapping to include the starting physical address of the data located in the NAND. At 635, data may be written. For example, the memory system may write data to the set of physical addresses in response to setting the flag.

The memory system may determine that the set of physical addresses are not consecutively indexed (e.g., random). In such cases, at 640, a flag may be set. For example, the memory system may set, based on the set of physical addresses failing to be consecutively indexed, a flag in an entry of a third subset of a mapping. The flag may indicate that the entry is associated with the third subset of the mapping. In such cases, the memory system may determine that the physical addresses are randomly indexed and set the flag in direct response to the determination.

At 645, an entry may be set. For example, the memory system may set the entry of the third subset of the mapping in response to determining that the set of physical addresses are not consecutively indexed. In such cases, the memory system may determine that the physical addresses are randomly indexed and set the entry in direct response to the determination. At 650, data may be written. For example, the memory system may write data to the set of physical addresses in response to setting the flag.

Figure 7:
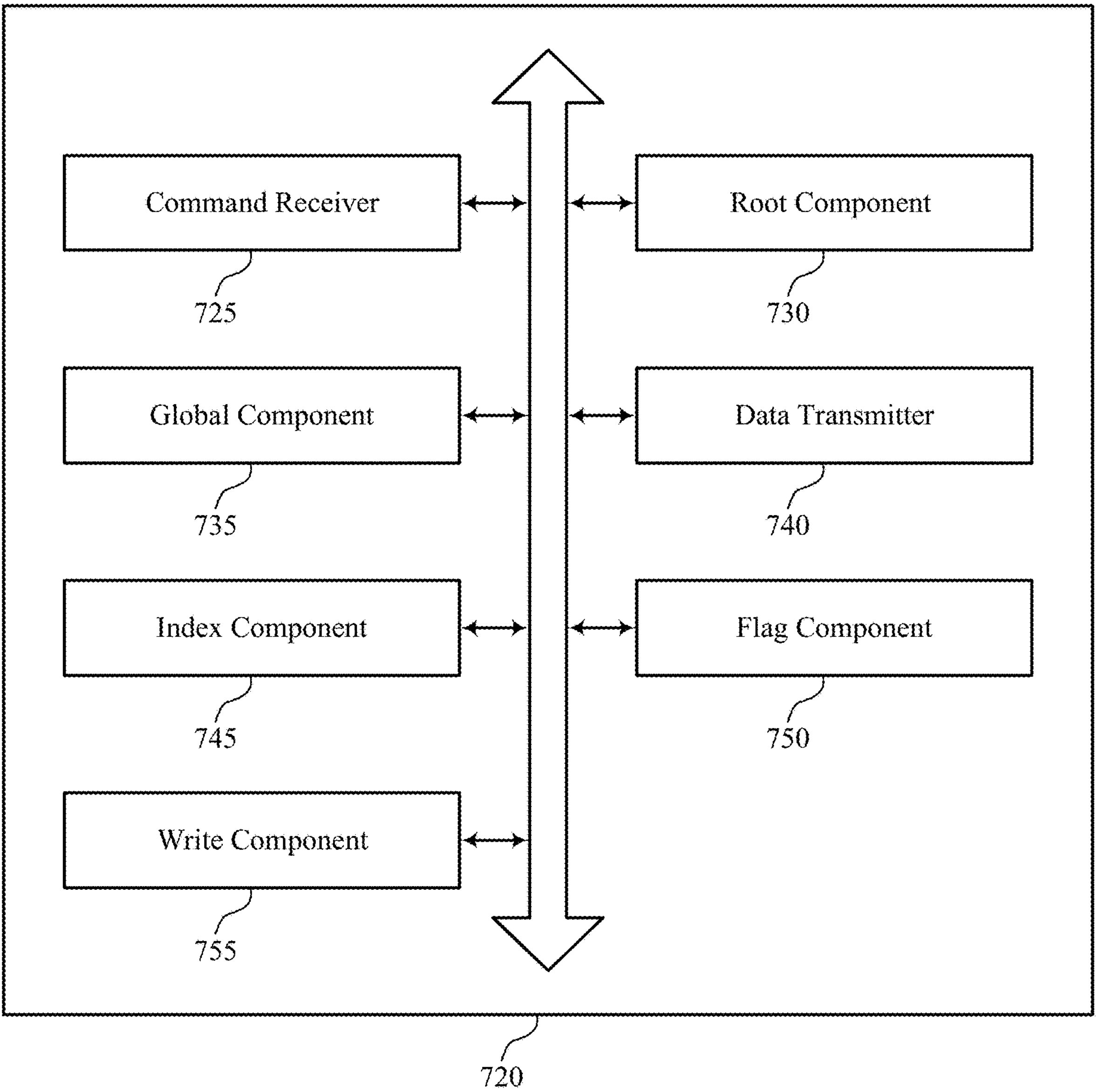
FIG. 7 shows a block diagram of a memory system that supports integrated pivot table in a logical-to-physical mapping in accordance with examples as disclosed herein.

FIG. 7 shows a block diagram 700 of a memory system 720 that supports integrated pivot table in a logical-to-physical mapping in accordance with examples as disclosed herein. The memory system 720 may be an example of aspects of a memory system as described with reference to FIGS. 1 through 6. The memory system 720, or various components thereof, may be an example of means for performing various aspects of integrated pivot table in a logical-to-physical mapping as described herein. For example, the memory system 720 may include a command receiver 725, a root component 730, a global component 735, a data transmitter 740, an index component 745, a flag component 750, a write component 755, or any combination thereof. Each of these components may communicate, directly or indirectly, with one another (e.g., via one or more buses).

The command receiver 725 may be configured as or otherwise support a means for receiving a read command including a logical block address of a non-volatile memory device. The root component 730 may be configured as or otherwise support a means for reading, based at least in part on the logical block address, a first entry of a first subset of a mapping that defines a relationship between the logical block address and a physical address. The global component 735 may be configured as or otherwise support a means for reading, based at least in part on reading the first entry of the first subset, a second entry of a second subset of the mapping, the second entry including at least a portion of a pivot table associated with physical addresses of the non-volatile memory device. The data transmitter 740 may be configured as or otherwise support a means for transmitting, to a host system, data retrieved from a physical address identified in the pivot table of the second subset of the mapping based at least in part on reading the second entry of the second subset of the mapping.

In some examples, the data transmitter 740 may be configured as or otherwise support a means for retrieving, from the non-volatile memory device, the data from the physical address identified using the pivot table of the second entry, where transmitting the data is based at least in part on retrieving the data.

In some examples, the data is retrieved from the physical address without reading a third subset of the mapping.

In some examples, the second entry of the second subset includes a flag that indicates whether the second entry is associated with a third subset of the mapping or is associated with a starting physical address of a set of physical addresses associated with the read command.

In some examples, the global component 735 may be configured as or otherwise support a means for determining whether the physical addresses of the set of physical addresses are consecutively indexed based at least in part on reading the second entry of the second subset of the mapping, where transmitting the data is based at least in part on determining that the physical addresses are consecutively indexed.

In some examples, the global component 735 may be configured as or otherwise support a means for identifying a starting physical address of a plurality of physical addresses that are consecutively indexed using the pivot table of the second entry. In some examples, the global component 735 may be configured as or otherwise support a means for identifying the physical address to access based at least in part on a starting logical block address and a difference between the starting logical block address and the logical block address.

In some examples, the flag component 750 may be configured as or otherwise support a means for refraining from reading a third entry of a third subset of the mapping based at least in part on a flag indicating that the second entry of the second subset of the mapping is associated with the physical addresses of the non-volatile memory device.

In some examples, the flag component 750 may be configured as or otherwise support a means for refraining from transferring, from the non-volatile memory device to a volatile memory device, at least a portion of a third subset of the mapping based at least in part on a flag indicating that the second entry of the second subset of the mapping is associated with the physical addresses of the non-volatile memory device.

In some examples, the pivot table includes a plurality of entries, an entry of the plurality of entries represents a plurality of logical block addresses that are consecutively indexed and, to support identifies a starting physical address of a plurality of physical addresses that are consecutively indexed, the plurality of physical addresses corresponding to the plurality of logical block addresses, and where reading the second entry of the second subset of the mapping, the global component 735 may be configured as or otherwise support a means for reading the entry of the plurality of entries, where transmitting, to the host system, the data is based at least in part on reading the entry.

In some examples, a third entry of the plurality of entries represents the logical block address that is non-consecutively indexed with other logical block addresses and identifies a fourth entry of a third subset of the mapping, the fourth entry of the third subset including the physical address associated with the logical block address.

In some examples, the command receiver 725 may be configured as or otherwise support a means for receiving a plurality of write commands for a set of physical addresses of a non-volatile memory device. The index component 745 may be configured as or otherwise support a means for determining whether the set of physical addresses are consecutively indexed based at least on receiving the plurality of write commands. The flag component 750 may be configured as or otherwise support a means for setting, based at least in part on the set of physical addresses being consecutively indexed, a flag in an entry of a second subset of a mapping that includes a first subset, the second subset, and a third subset, the entry of the second subset including at least a portion of a pivot table associated with the set of physical addresses. The write component 755 may be configured as or otherwise support a means for writing data to the set of physical addresses based at least in part on setting the flag.

In some examples, the flag that indicates whether the entry is associated with the third subset of the mapping or is associated with a starting physical address of the set of physical addresses associated with the plurality of write commands.

In some examples, the index component 745 may be configured as or otherwise support a means for setting the entry of the second subset of the mapping to indicate a starting physical address based at least in part on determining that the set of physical addresses are consecutively indexed.

In some examples, the global component 735 may be configured as or otherwise support a means for identifying that the pivot table is included in the second subset of the mapping based at least in part on receiving the plurality of write commands, where setting the flag is based at least in part on identifying the pivot table.

In some examples, the global component 735 may be configured as or otherwise support a means for generating the pivot table to be included in the second subset of the mapping based at least in part on receiving the plurality of write commands, where setting the flag is based at least in part on generating the pivot table.

In some examples, the global component 735 may be configured as or otherwise support a means for replacing the entry of the second subset of the mapping including a pointer with at least the portion of the pivot table, where setting the flag is based at least in part on replacing the entry.

In some examples, the global component 735 may be configured as or otherwise support a means for storing at least the portion of the pivot table in the entry of the second subset of the mapping based at least in part on receiving the plurality of write commands, where setting the flag is based at least in part on storing at least the portion of the pivot table.

In some examples, the pivot table includes a plurality of entries, a first entry of the plurality of entries represents a plurality of logical block addresses that are consecutively indexed and identifies a starting physical address of a plurality of physical addresses that are consecutively indexed, the plurality of physical addresses corresponding to the plurality of logical block addresses.

Figure 8:
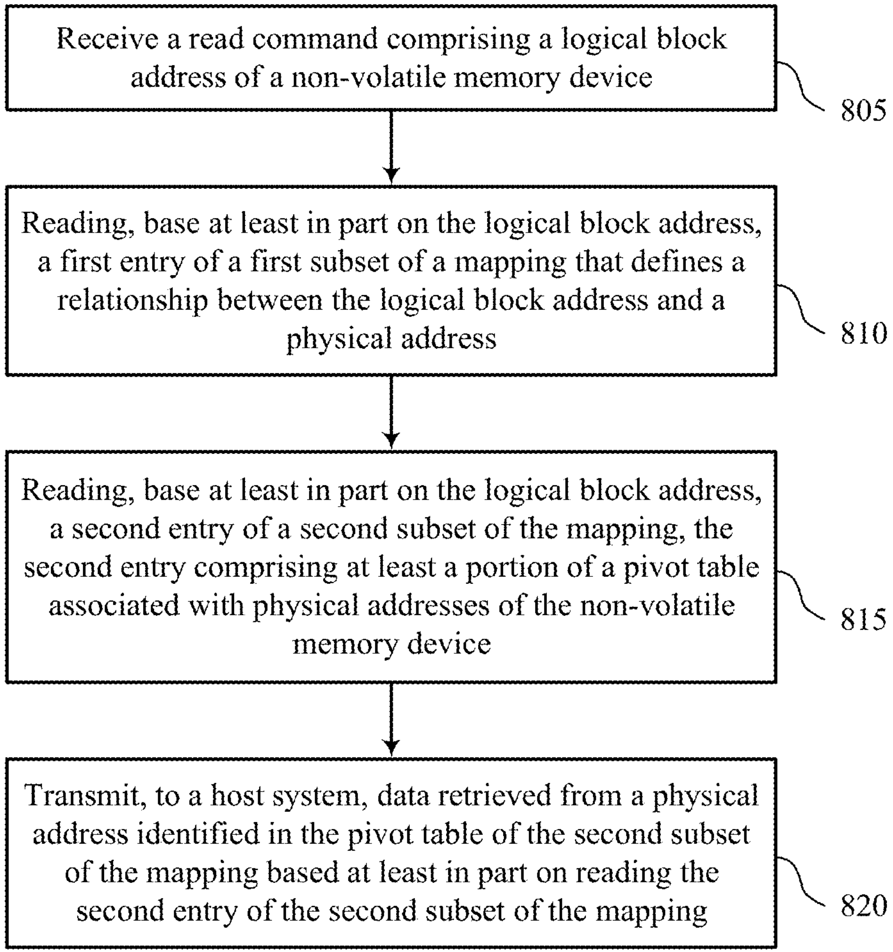
FIGS. 8 and 9 show flowcharts illustrating a method or methods that support integrated pivot table in a logical-to-physical mapping in accordance with examples as disclosed herein.

FIG. 8 shows a flowchart illustrating a method 800 that supports integrated pivot table in a logical-to-physical mapping in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally or alternatively, the memory system may perform aspects of the described functions using special-purpose hardware.

At 805, a read command may be received. For example, the method may include receiving a read command including a logical block address of a non-volatile memory device. The operations of 805 may be performed in accordance with examples as disclosed herein. In some examples, aspects of the operations of 805 may be performed by a command receiver 725 as described with reference to FIG. 7.

At 810, a first entry may be read. For example, the method may include reading, based at least in part on the logical block address, a first entry of a first subset of a mapping that defines a relationship between the logical block address and a physical address. The operations of 810 may be performed in accordance with examples as disclosed herein. In some examples, aspects of the operations of 810 may be performed by a root component 730 as described with reference to FIG. 7.

At 815, a second entry may be read. For example, the method may include reading, based at least in part on reading the first entry of the first subset, a second entry of a second subset of the mapping, the second entry including at least a portion of a pivot table associated with physical addresses of the non-volatile memory device. The operations of 815 may be performed in accordance with examples as disclosed herein. In some examples, aspects of the operations of 815 may be performed by a global component 735 as described with reference to FIG. 7.

At 820, data may be transmitted. For example, the method may include transmitting, to a host system, data retrieved from a physical address identified in the pivot table of the second subset of the mapping based at least in part on reading the second entry of the second subset of the mapping. The operations of 820 may be performed in accordance with examples as disclosed herein. In some examples, aspects of the operations of 820 may be performed by a data transmitter 740 as described with reference to FIG. 7.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving a read command including a logical block address of a non-volatile memory device, reading, based at least in part on the logical block address, a first entry of a first subset of a mapping that defines a relationship between the logical block address and a physical address, reading, based at least in part on reading the first entry of the first subset, a second entry of a second subset of the mapping, the second entry including at least a portion of a pivot table associated with physical addresses of the non-volatile memory device, and transmitting, to a host system, data retrieved from a physical address identified in the pivot table of the second subset of the mapping based at least in part on reading the second entry of the second subset of the mapping.

Some examples of the method 800 and the apparatus described herein may further include operations, features, circuitry, logic, means, or instructions for retrieving, from the non-volatile memory device, the data from the physical address identified using the pivot table of the second entry, where transmitting the data may be based at least in part on retrieving the data.

In some examples of the method 800 and the apparatus described herein, the data may be retrieved from the physical address without reading a third subset of the mapping.

In some examples of the method 800 and the apparatus described herein, the second entry of the second subset includes a flag that indicates whether the second entry may be associated with a third subset of the mapping or may be associated with a starting physical address of a set of physical addresses associated with the read command.

Some examples of the method 800 and the apparatus described herein may further include operations, features, circuitry, logic, means, or instructions for determining whether the physical addresses of the set of physical addresses may be consecutively indexed based at least in part on reading the second entry of the second subset of the mapping, where transmitting the data may be based at least in part on determining that the physical addresses may be consecutively indexed.

Some examples of the method 800 and the apparatus described herein may further include operations, features, circuitry, logic, means, or instructions for identifying a starting physical address of a plurality of physical addresses that may be consecutively indexed using the pivot table of the second entry and identifying the physical address to access based at least in part on a starting logical block address and a difference between the starting logical block address and the logical block address.

Some examples of the method 800 and the apparatus described herein may further include operations, features, circuitry, logic, means, or instructions for refraining from reading a third entry of a third subset of the mapping based at least in part on a flag indicating that the second entry of the second subset of the mapping may be associated with the physical addresses of the non-volatile memory device.

Some examples of the method 800 and the apparatus described herein may further include operations, features, circuitry, logic, means, or instructions for refraining from transferring, from the non-volatile memory device to a volatile memory device, at least a portion of a third subset of the mapping based at least in part on a flag indicating that the second entry of the second subset of the mapping may be associated with the physical addresses of the non-volatile memory device.

In some examples of the method 800 and the apparatus described herein, the pivot table includes a plurality of entries, an entry of the plurality of entries represents a plurality of logical block addresses that may be consecutively indexed, and identifies a starting physical address of a plurality of physical addresses that may be consecutively indexed, the plurality of physical addresses corresponding to the plurality of logical block addresses, and where reading the second entry of the second subset of the mapping may include operations, features, circuitry, logic, means, or instructions for reading the entry of the plurality of entries, where transmitting, to the host system, the data may be based at least in part on reading the entry.

In some examples of the method 800 and the apparatus described herein, a third entry of the plurality of entries represents the logical block address that may be non-consecutively indexed with other logical block addresses and identifies a fourth entry of a third subset of the mapping, the fourth entry of the third subset including the physical address associated with the logical block address.

Figure 9:
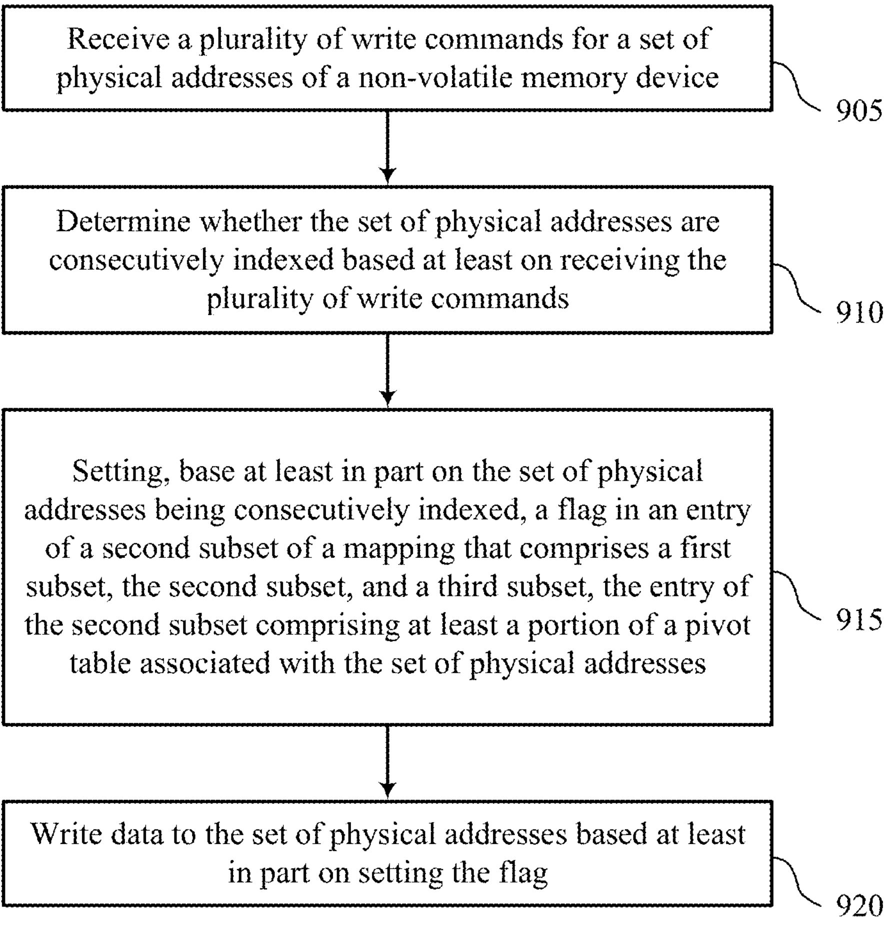

FIG. 9 shows a flowchart illustrating a method 900 that supports integrated pivot table in a logical-to-physical mapping in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the device to perform the described functions. Additionally or alternatively, the memory system may perform aspects of the described functions using special-purpose hardware.

At 905, a plurality of commands may be received. For example, the method may include receiving a plurality of write commands for a set of physical addresses of a non-volatile memory device. The operations of 905 may be performed in accordance with examples as disclosed herein. In some examples, aspects of the operations of 905 may be performed by a command receiver 725 as described with reference to FIG. 7.

At 910, a determination may be made. For example, the method may include determining whether the set of physical addresses are consecutively indexed based at least on receiving the plurality of write commands. The operations of 910 may be performed in accordance with examples as disclosed herein. In some examples, aspects of the operations of 910 may be performed by an index component 745 as described with reference to FIG. 7.

At 915, a flag may be set. For example, the method may include setting, based at least in part on the set of physical addresses being consecutively indexed, a flag in an entry of a second subset of a mapping that includes a first subset, the second subset, and a third subset, the entry of the second subset including at least a portion of a pivot table associated with the set of physical addresses. The operations of 915 may be performed in accordance with examples as disclosed herein. In some examples, aspects of the operations of 915 may be performed by a flag component 750 as described with reference to FIG. 7.

At 920, data may be written. For example, the method may include writing data to the set of physical addresses based at least in part on setting the flag. The operations of 920 may be performed in accordance with examples as disclosed herein. In some examples, aspects of the operations of 920 may be performed by a write component 755 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for receiving a plurality of write commands for a set of physical addresses of a non-volatile memory device, determining whether the set of physical addresses are consecutively indexed based at least on receiving the plurality of write commands, setting, based at least in part on the set of physical addresses being consecutively indexed, a flag in an entry of a second subset of a mapping that includes a first subset, the second subset, and a third subset, the entry of the second subset including at least a portion of a pivot table associated with the set of physical addresses, and writing data to the set of physical addresses based at least in part on setting the flag.

In some examples of the method 900 and the apparatus described herein, the flag that indicates whether the entry may be associated with the third subset of the mapping or may be associated with a starting physical address of the set of physical addresses associated with the plurality of write commands.

Some examples of the method 900 and the apparatus described herein may further include operations, features, circuitry, logic, means, or instructions for setting the entry of the second subset of the mapping to indicate a starting physical address based at least in part on determining that the set of physical addresses may be consecutively indexed.

Some examples of the method 900 and the apparatus described herein may further include operations, features, circuitry, logic, means, or instructions for identifying that the pivot table may be included in the second subset of the mapping based at least in part on receiving the plurality of write commands, where setting the flag may be based at least in part on identifying the pivot table.

Some examples of the method 900 and the apparatus described herein may further include operations, features, circuitry, logic, means, or instructions for generating the pivot table to be included in the second subset of the mapping based at least in part on receiving the plurality of write commands, where setting the flag may be based at least in part on generating the pivot table.

Some examples of the method 900 and the apparatus described herein may further include operations, features, circuitry, logic, means, or instructions for replacing the entry of the second subset of the mapping including a pointer with at least the portion of the pivot table, where setting the flag may be based at least in part on replacing the entry.

Some examples of the method 900 and the apparatus described herein may further include operations, features, circuitry, logic, means, or instructions for storing at least the portion of the pivot table in the entry of the second subset of the mapping based at least in part on receiving the plurality of write commands, where setting the flag may be based at least in part on storing at least the portion of the pivot table.

In some examples of the method 900 and the apparatus described herein, the pivot table includes a plurality of entries, a first entry of the plurality of entries represents a plurality of logical block addresses that may be consecutively indexed and identifies a starting physical address of a plurality of physical addresses that may be consecutively indexed, the plurality of physical addresses corresponding to the plurality of logical block addresses.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and one or more controllers coupled with the one or more memory devices and configured to cause the memory system to:

read a first entry of a mapping between a first address and a second address in accordance with a read command;

read a second entry of the mapping in accordance with reading the first entry, the second entry comprising at least a portion of a pivot table associated with second addresses of the one or more memory devices, wherein the second entry comprises a flag that indicates whether the second entry is associated a starting physical address of a set of physical addresses associated with the read command;

determine that physical addresses of the set of physical addresses are consecutively indexed based at least in part on a value of the flag; and obtain data from the second address identified in the pivot table based at least in part on the physical addresses of the set of physical addresses being consecutively indexed.

2. The memory system of claim 1, wherein the one or more controllers are configured to cause the memory system to:

receive the read command from a host system coupled with the memory system, wherein the read command comprises the first address.

3. The memory system of claim 1, wherein the one or more controllers are configured to cause the memory system to:

transmit the data to a host system coupled with the memory system in accordance with obtaining the data from the second address identified in the pivot table.

4. The memory system of claim 1, wherein:

the mapping comprises a first subset associated with a plurality of first entries including the first entry, a second subset associated with a plurality of second entries including the second entry, and a third subset associated with a plurality of third entries including a third entry, and the second entry comprises flag further indicates whether the second entry is associated with the third subset of the mapping or is associated with a starting physical address of a set of physical addresses associated with the read command.

5. The memory system of claim 4, wherein the one or more controllers are configured to cause the memory system to:

refrain from reading the third entry of the third subset of the mapping based at least in part on a value of the flag indicating that the second entry is associated with the starting physical address of the set of physical addresses associated with the read command.

6. The memory system of claim 4, wherein, to identify the second address, the one or more controllers are configured to cause the memory system to:

identify the starting physical address of the set of physical addresses that are consecutively indexed using the pivot table of the second entry; and identify the second address to access based at least in part on a starting logical block address and a difference between the starting logical block address and the first address.

7. A memory system, comprising:

one or more memory devices; and one or more controllers coupled with the one or more memory devices and configured to cause the memory system to:

receive a write command associated with a set of physical addresses of the one or more memory devices, wherein the set of physical addresses are consecutively indexed;

generate a pivot table to be included in a first subset of a mapping based at least in part on the set of physical addresses being consecutively indexed;

set a flag in an entry of the first subset of a mapping in accordance with receiving the write command and based at least in part on generating the pivot table, the entry comprising at least a portion of the pivot table associated with the set of physical addresses; and write data to the set of physical addresses in accordance with setting the flag.

8. The memory system of claim 7, wherein the one or more controllers are configured to cause the memory system to:

replace a pointer included in the entry of the first subset of the mapping with the portion of the pivot table, wherein setting the flag in the entry of the first subset of the mapping is based at least in part on replacing the pointer included in the entry of the first subset of the mapping with the portion of the pivot table.

9. The memory system of claim 7, wherein a quantity of entries included in the pivot table is based at least in part on a size of a second subset of the mapping.

10. The memory system of claim 7, wherein the pivot table comprises a data structure representing a compressed version of a second subset of the mapping.

11. The memory system of claim 7, wherein the portion of the pivot table indicates whether the data is valid data or invalid data.

12. A method at a memory system, comprising:

reading a first entry of a mapping between a first address and a second address in accordance with a read command;

reading a second entry of the mapping in accordance with reading the first entry, the second entry comprising at least a portion of a pivot table associated with second addresses of the memory system, wherein the second entry comprises a flag that indicates whether the second entry is associated a starting physical address of a set of physical addresses associated with the read command;

determining that physical addresses of the set of physical addresses are consecutively indexed based at least in part on a value of the flag; and obtaining data from the second address identified in the pivot table based at least in part on the physical addresses of the set of physical addresses being consecutively indexed.

13. The method of claim 12, further comprising:

receiving the read command from a host system coupled with the memory system, wherein the read command comprises the first address.

14. The method of claim 12, further comprising:

transmitting the data to a host system coupled with the memory system in accordance with obtaining the data from the second address identified in the pivot table.

15. The method of claim 12, wherein:

the mapping comprises a first subset associated with a plurality of first entries including the first entry, a second subset associated with a plurality of second entries including the second entry, and a third subset associated with a plurality of third entries including a third entry, and the second entry comprises flag further indicates whether the second entry is associated with the third subset of the mapping or is associated with a starting physical address of a set of physical addresses associated with the read command.

16. The method of claim 15, further comprising:

refraining from reading the third entry of the third subset of the mapping based at least in part on a value of the flag indicating that the second entry is associated with the starting physical address of the set of physical addresses associated with the read command.

17. The method of claim 15, wherein identifying the second address comprises:

identifying the starting physical address of the set of physical addresses that are consecutively indexed using the pivot table of the second entry; and identifying the second address to access based at least in part on a starting logical block address and a difference between the starting logical block address and the first address.

* * * * *